K. S. JOHNSON.
COMMON BATTERY SUBSTATION.
APPLICATION FILED FEB. 1, 1918.
1,399,775.
Patented Dec. 13, 1921.
2 SHEETS—SHEET 2.
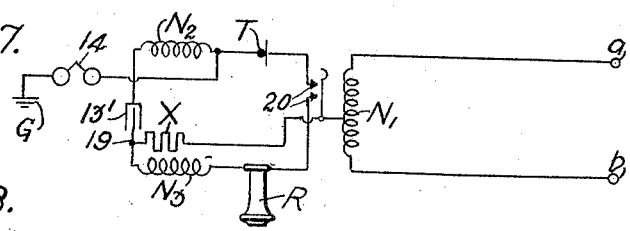
Fig. 7.
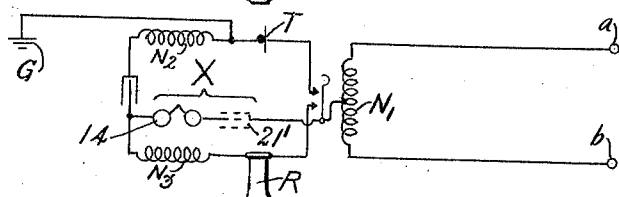
Fig. 8.
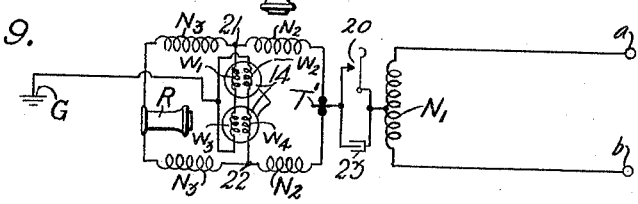
Fig. 9.
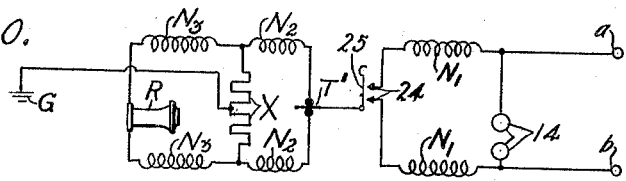
Fig. 10.
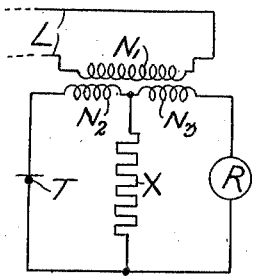
Fig. 7.ª
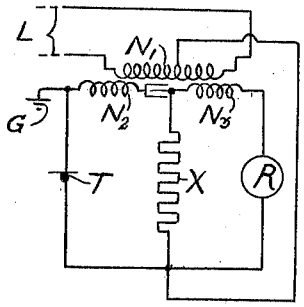
Fig. 7.ᵇ
Inventor:
Kenneth S. Johnson.
by J. G. Roberts Atty.

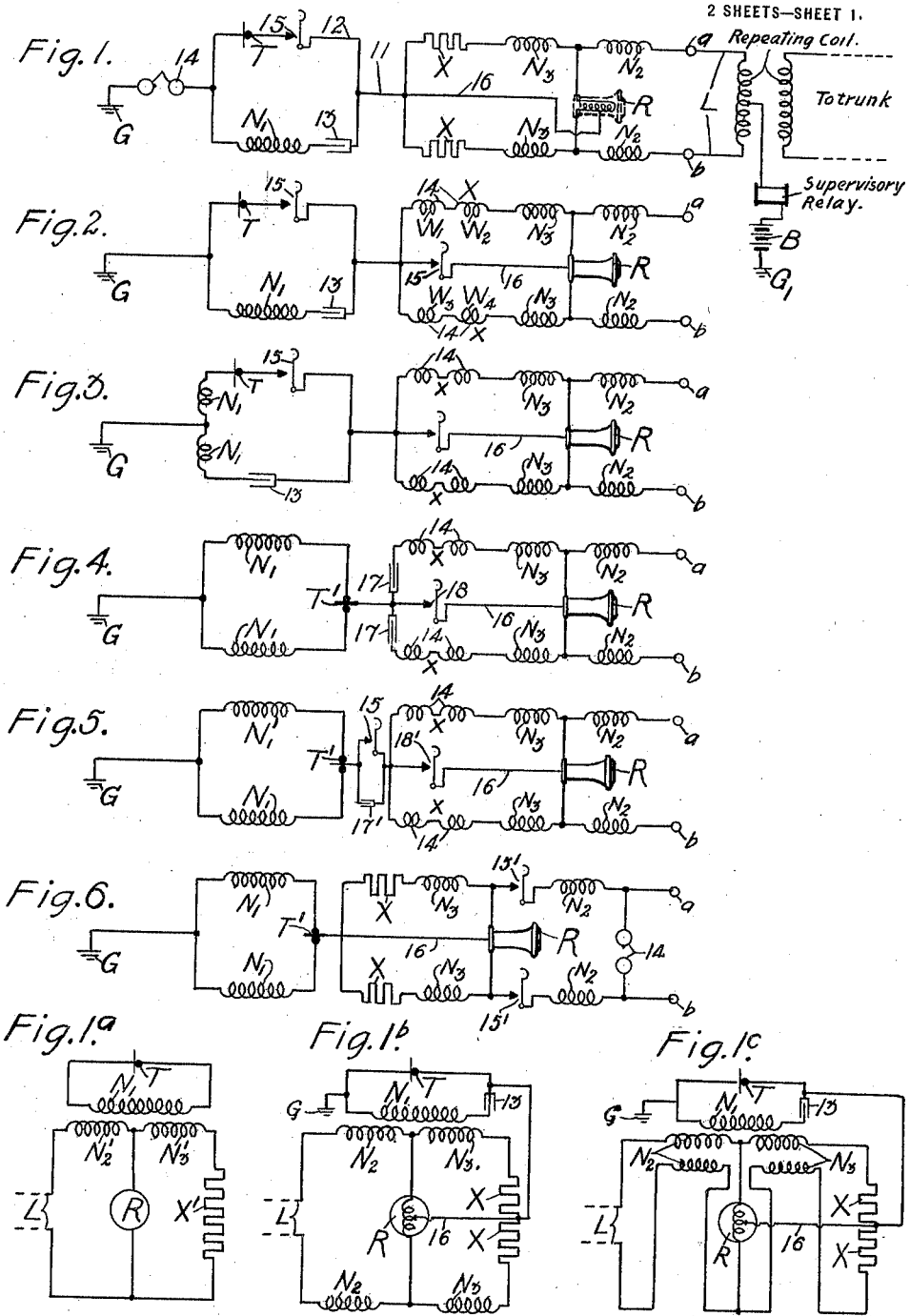

UNITED STATES PATENT OFFICE.

KENNETH S. JOHNSON, OF JERSEY CITY, NEW JERSEY, ASSIGNOR TO WESTERN ELECTRIC COMPANY, INCORPORATED, OF NEW YORK, N. Y., A CORPORATION OF NEW YORK.

COMMON-BATTERY SUBSTATION.

1,399,775.  Specification of Letters Patent.  Patented Dec. 13, 1921.

Application filed February 1, 1918. Serial No. 214,944.

*To all whom it may concern:*

Be it known that I, KENNETH S. JOHNSON, a citizen of the United States, residing at Jersey City, in the county of Hudson, State of New Jersey, have invented certain new and useful Improvements in Common-Battery Substations, of which the following is a full, clear, concise, and exact description.

This invention relates to telephone substations adapted for use on common battery systems. More particularly an object of the invention is to produce substations free from side tone, in which the direct current supply is fed from a central battery over both line wires in parallel with a ground return. This results in saving three-quarters of the energy which would be consumed in the line in feeding the battery current over the line wires in series, provided the same current is maintained through the substation. The usual supervisory relay can then be designed to have a large operating margin, since it can be wound to a higher relative impedance and does not have to be shunted with a non-inductive resistance. Other objects are to prevent differences of fluctuating or alternating potential of the ground between the central office and the subscriber's station affecting the talking circuit, to provide for using the impedance of the ringer coils as a non-inductive resistance in place of the balancing resistance ordinarily used to prevent side tone, to reduce the number and size of condensers used in circuits of the type under discussion, to reduce to a minimum the condensers in the talking circuits, to produce circuits suitable for desk stand sets with the use of only a few connecting conductor cords and to shunt the battery supply current around the balancing resistance element by means of a connection of negligible resistance running to the mid-point of the receiver winding.

The invention may be embodied in a large number of forms of which a few typical modifications are described herein, and shown in the accompanying drawings, wherein Figs. 1 to 10 show respectively ten forms of substations, all of which have provision for feeding battery current from a central common source over both sides of the line in parallel, and all of which when properly designed will be substantially free from side tone; Fig. 1 (*a*) is a diagrammatic illustration of the type of anti-side tone circuit to which the arrangements of Figs. 1 to 6 inclusive belong; Fig. 1 (*b*) is a diagrammatic rearrangement of Fig. 1 to show its similarity to Fig. 1 (*a*); Fig. 1 (*c*) is a diagram intended to show the association of the coils of the transformer used in the substation; Fig. 7 (*a*) is a diagrammatic illustration of the fundamental type of anti-side tone circuit to which the arrangements of Figs. 7 to 10 inclusive belong; Fig. 7 (*b*) is a diagrammatic rearrangement of Fig. 7 to show its essential equivalence to Fig. 7 (*a*.)

Referring particularly to Fig. 1, the central source of energy B is connected into the middle point of the primary of the repeating coil and the current passes over the branches of the line L to the substation terminals $a$ and $b$. Each terminal $a$ and $b$ is connected to a series of elements consisting of one coil $N_2$, one coil $N_3$ and one non-inductive resistance X. The coils $N_2$ consist of the same number of turns, as do the coils $N_3$. The resistances X are equal to each other. Between the coils $N_2$ and $N_3$ on each side is connected receiver R. The terminals of resistances X remote from $a$ and $b$ are connected at any suitable point to the transmitter circuit 12 by a suitable connection 11. The transmitter circuit contains the transmitter T, the coil $N_1$, and a condenser 13. The transmitter T is illustrated by a conventional microphone but may be of any suitable type, as electromagnetic. The bell or ringer 14 is connected in a lead between the circuit 12 and the ground G. The connection of bell 14 to circuit 12 is so placed relatively to the elements thereof as to cause current from the battery B to pass through and energize the transmitter T. The points 15 represent switchhook contacts where the circuit is to be closed when talking and broken when not talking. From the connection 11 to the middle point of the receiver winding may be placed a conductive connection 16 in case it is not desired to pass the battery supply current through the balancing resistances X. In order to secure proper balance of the circuit the two parts of resistance X should be equal, the two parts of coil $N_3$ should be identical and the two parts of coil $N_2$ should be identical.

The circuit illustrated in Fig. 2 is identical with that of Fig. 1, except that the ringer coils 14 constitute the balancing resistance X. As in the ordinary type of ringer the windings of the ringer are wound in two coils. The windings $W_1$ and $W_3$ are on one spool of the ringer, and $W_2$ and $W_4$ are on the other spool. The result is that the impedance of the ringer to high frequency talking currents which pass through $W_1$, $W_2$, $W_3$ and $W_4$ in series is merely that of the resistance of the coils, since the field of $W_1$ neutralizes that of $W_3$ and the field of $W_2$ neutralizes that of $W_4$. To currents passing through ground, the pair of windings $W_1$ and $W_2$ would be in parallel with $W_3$ and $W_4$ and cause the bell to ring as usual. This arrangement permits combining the bell 14 and the resistance X, thus eliminating one element, and at the same time, one resistance to the battery supply current from source B. In case the connection 16 is used there will be practically no resistance to common battery current in the substation, except the transmitter T, since coils $N_2$ and $N_3$ are of slight resistance. Connection 16 must be opened by a contact on the receiver-hook when the station is not in use.

If there is a large difference of alternating potential between the central office ground $G_1$ and ground G, this might be impressed through coil $N_1$ upon the talking circuit. This could be obviated by the means shown in Fig. 3, where the coil $N_1$ is divided into two parts, and the ground G applied to their junction as shown. The action of an alternating ground potential would then be neutralized. In other respects the arrangement of Fig. 3 is like that of Fig. 2.

Fig. 4 shows an arrangement which should be almost absolutely free from the disturbing influence of alternating ground potentials. Here the transmitter T' is of the two-electrode or so-called two-button type. With this circuit the condenser 13 is eliminated, hence each side of the circuit contains identical elements, for which reason the circuit is balanced. Condensers 17 may be used, which will serve to annul any undesired inductance of the elements 14, $N_2$ or $N_3$. Use of these condensers also enables the circuit of the battery B to be opened by a single contact 18 when no conversation is taking place, while it provides a negligible resistance path 16 for the current from battery B while the substation is in use.

The arrangement of Fig. 5 is closely similar to that of Fig. 4. Instead of the two condensers 17, a single condenser 17' is used between the transmitter and coils 14. Contacts 15 and 18' are closed when the circuit is used to talk, and opened at other times for ringing. Connection 16 may be omitted. This circuit is perfectly balanced, provided both sides of the transmitter are of equal resistance, and needs no condenser in the paths through which talking currents flow to direct the battery current through the transmitter.

Fig. 6 is also a perfectly balanced circuit. In this arrangement the resistance element X is used as in Fig. 1 instead of the ringer coil arrangement of Fig. 2. The ringer 14 is placed directly across the line. Both ringing and talking are here accomplished over a metallic circuit. This circuit is unique in that it has a common battery supply and with no condenser all the current passes through the transmitter and does not affect the receiver. Contacts 15' may be placed as shown.

The coils $N_1$, $N_2$ and $N_3$ are windings of a single transformer and are on the same magnetic circuit as shown in Fig. 1 (c), which is a rearrangement of Fig. 1. Fig. 1 (b) is another rearrangement of Fig. 1, intended to show that the circuit is equivalent, as respects talking currents, to that of Fig. 1 (a). With respect to talking current, the coils $N_2$ are in series with the line L, and the balancing resistances X and the coils $N_3$ are in series, hence coil $N^1_2$ of Fig. 1 (a) is equivalent to the sum of coils $N_2$ and $N_2$ of Fig. 1 (b) if the turns of $N^1_2$ are the sum of the number of turns of coils $N_2$ and $N_2$. Likewise coils $N_3$ are equivalent to the coil $N^1_3$ and resistances X are equivalent to a resistance X' of a value equal to the sum of X and X. It can be shown that the circuit of Fig. 1 (a) and hence the circuit of Fig. 1 can be designed so that (1) the transmitter and receiver will be approximately conjugate; (2) the line and auxiliary resistance means X will be approximately conjugate; (3) that for a given line having a definite impedance the telephonic energy delivered by the transmitter shall be a maximum; (4) that the amount of energy delivered by the substation to the given line shall be a maximum; and (5) that at a small sacrifice of efficiency it is possible to discriminate effectively against disturbing line noise as distinguished from telephonic signals from a communicating station.

Thus, assuming a perfect transformer and ideal elements whose impedances act as resistances, if $R_1$, $R_2$, $R_3$, $R_4$ are the transmitter, receiver, auxiliary and line resistances respectively; $r$ is the ratio of turns in the coil $N^1_2$ to those of $N_1$; $r'$ is the ratio of turns in the coil $N^1_3$ to those of $N_1$; and if $y$ is the energy ratio, which is defined as the ratio of telephonic energy absorbed in the transmitter to that absorbed in the receiver, when receiving; then the above five conditions are fulfilled when $$\left.\begin{array}{l} r = \sqrt{\dfrac{R_4}{R_1} \cdot \dfrac{y}{(1+y)}} \\ r' = \sqrt{\dfrac{R_4}{R_1} \cdot \dfrac{1}{y(1+y)}} \\ R_3 = \dfrac{R_4}{y} \\ R_2 = \dfrac{R_4}{1+y} \end{array}\right\} A$$

Proof of the above formulæ (A) and also the formulæ (B) hereafter given, will be found in the U. S. Patent to George A. Campbell, No. 1,254,472, January 22, 1918. Since the circuits of Figs. 2 to 6 inclusive are similar to those of Fig. 1, with respect to the five conditions mentioned above, the formulæ (A) are equally applicable to those arrangements. When considering the application of the formulæ (A) to the arrangements of Figs. 1 to 6 inclusive, it will be understood that the total turns of both of the coils $N_2$ is equal to the number of turns of coil $N'_2$ of Fig. 1 (a), that the total turns of both of coils $N_3$ equals the number of turns of $N'_3$, and that X' represents a resistance of numerical value equal to the sum of the values of resistances X and X in Figs. 1 to 6, that the coils $N_2$ are equal, coils $N_3$ are equal and that resistances X are equal.

In Fig. 7 is disclosed a somewhat different arrangement in which in series with the line between the points $a$ and $b$, which constitute the substation terminals, is placed the coil $N_1$. From the middle point of $N_1$, a connection is made through resistance X to point 19, from which connection is made through coil $N_2$ to transmitter T and through coil $N_3$ to receiver R. The terminals of transmitter T and receiver R are connected to the said point of winding $N_1$ through the contacts 20 which may be opened when the substation is not in use. In series with transmitter T is winding $N_2$; in series with receiver R is winding $N_3$; while the opposite terminals of the three branches have a common point 19. A condenser 13' prevents the direct current from being shunted through elements R or X. A ground connection G allows the direct current to pass through and energize the transmitter and the ringer 14 is placed in this ground connection.

Fig. 8 is similar to Fig. 7, but the ringer 14 here constitutes the resistance X. As ringer coils possess considerable inductive reactance it might be advisable to approximately balance this by a condenser 21'. It will be seen by the fourth of formulæ (B) hereinafter stated, that with energy ratios (y) of a value of unity or greater the voice frequency impedance of impedance X, consisting of ringer 14 and condenser 21', would be one-half or less than one-half of the resistance of transmitter T. A transmitter T of somewhat high resistance would therefore be necessary for satisfactory operation of this arrangement.

In Fig. 9 is an arrangement similar to Fig. 8, using a transmitter T' of the same type as in Fig. 4, known as two-electrode, push-and-pull, or double button. The ringer 14 is used as a balancing resistance with the coils wound as shown so that the ringer is substantially non-inductive to current passing through the coils $W_1, W_2, W_3, W_4$, in series from the point 21 to the point 22. A condenser 23 enables ringing current to pass when the substation is not being used for talking. In this circuit also, as in Figs. 5 and 6, all the common battery direct current passes through the transmitter and none through the receiver without the use of a condenser in the talking circuit.

In Fig. 10, the ringer 14 is not used as an anti-side tone resistance element but is placed directly across the line, thereby enabling both ringing and talking to be done over a full metallic circuit. No condenser is needed in this circuit. The contacts 24 are located as shown, the hook 25 serving to join both contacts and connect them to transmitter T'. In Figs. 9 and 10, the coils $N_2$ and $N_3$ are each divided into two parts located as shown for the purpose of keeping the two sides of the circuit balanced. Each of the parts of coil $N_2$ is designated $N_2$, and each of the parts of coil $N_3$ is designated $N_3$. However these coils may be arranged, they are all wound on a single magnetic circuit and constitute a single transformer.

Fig. 7 (a) is a diagrammatic representation of the essential elements of the circuits of Figs. 7 to 10 inclusive. Fig 7 (b) is a rearrangement of Fig. 7 to show its similarity to Fig. 7 (a). By proper design and proportioning of the parts these circuits will fulfil all the five fundamental requirements mentioned hereinbefore in this specification. Assuming a perfect transformer and ideal elements whose impedances act as resistance, the requirements will be fulfilled when the following formulæ are fulfilled:

$$\left.\begin{array}{l} r = \sqrt{\dfrac{R_1}{R_4} \cdot \dfrac{y}{(1+y)}} \\ r' = \sqrt{\dfrac{R_1}{R_4} \cdot \dfrac{1}{y(1+y)}} \\ R_2 = \dfrac{R_1}{y} \\ R_3 = \dfrac{R_1}{1+y} \end{array}\right\} B$$

In the above formulæ, $R_1, R_2, R_3, R_4$ are the transmitter, receiver auxiliary and line resistances respectively, $r$ is the ratio of turns in the coils $N_2$ to those of $N_1$, and $r'$ is the ratio of turns of the coils $N_3$ to those of $N_1$, and $y$ is the energy ratio.

Since Figs. 7 to 10 inclusive show essentially similar arrangements, the above formulæ are applicable to each of them. They may all be arranged in the form of Fig. 7 (b) and designed to fulfil the requirements of the formulæ. As regards Figs. 9 and 10, it should be remembered that when coils $N_2$ and $N_3$ are divided in two parts, each of the parts should contain one-half the whole number of turns required by the formulæ (B) for the whole coil.

The disclosure herein of certain forms of circuit is not intended to limit the invention to those forms only, as many equivalent arrangements may be devised which will fall within the scope of the appended claims which are intended to cover all such equivalents which the state of the art will allow.

Furthermore, it is not desired to limit the design of the substations herein disclosed and illustrated to the accompanying design formulæ. These formulæ are derived on the assumption that ideal transformers are used and that the component elements of the substation have no reactance, assumptions which are only approximately true in practice. These formulæ may be modified when greater precision is desired. It will be understood that in the appended claims, where certain elements are said to be conjugate, or certain impedance relations are said to exist, since in practice these conditions can only in general be approximated, that these expressions will be satisfied by structures conforming substantially thereto, especially where some compromise with respect to the rigid requirements is necessary in order to discriminate against line noise. It should also be understood that some features of my invention as expressed in the appended claims may be embodied in substations which fulfil only a part of the five fundamental conditions stated, or only approximately fulfil one or more of the said conditions.

The expression "signaling currents" as used herein refers to voice current or current used to transmit signals as distinguished from energizing current or current to ring a bell. Current to operate the ring 14 is referred to as "ringing" or "calling" current.

What is claimed is:

1. An anti-side tone substation circuit including branches conjugate with respect to signaling currents, a transmitting instrument and a receiving instrument in said branches respectively, a ground connection, and a substation terminal so arranged that a direct potential difference between said ground and said terminal will cause current to flow through said transmitting instrument.

2. An anti-side-tone substation circuit comprising a receiver and a transmitter, means for substantially preventing signaling current from said transmitter from energizing said receiver, said circuit having means associated therewith whereby energizing current is supplied from a common battery source over a plurality of line wires in parallel, and means for transmitting voice currents from said substation over two of said lines wires in series.

3. An anti-side-tone substation circuit comprising a receiver and a transmitter, means for substantially preventing signaling current from said transmitter from energizing said receiver, means connected to said circuit whereby energizing current is supplied to said transmitter over two line conductors in parallel, and means for transmitting voice currents from said substation over said two line conductors in series.

4. A substation including a transmitter and a receiver, said substation having a balancing impedance element which has a resistance path therethrough, said balancing impedance element being so designed and associated with said transmitter and receiver as to render said substation free from side tone, means for feeding energizing current from a central office over two line conductors in parallel, and means for causing the energizing current to be shunted around said resistance path.

5. An anti-side-tone substation including a transmitter, a receiver, a balancing resistance and a transformer, means for connecting said substation to a line consisting of two conductors whereby current for energizing said transmitter may be supplied from a central station over said conductors in parallel, said elements being so proportioned and related with respect to signaling current that said transmitter and said receiver are conjugate.

6. An anti-side tone substation including a transmitter, a receiver, a balancing resistance and a transformer, means for connecting said substation to a line consisting of two conductors whereby current for energizing said transmitter may be supplied from a central station over said conductors in parallel, said elements being so proportioned and related with respect to signaling current that said line and said balancing resistance are conjugate.

7. An anti-side-tone substation including a transmitter, a receiver, an auxiliary resistance and a transformer, means for connecting said substation to a line consisting of two conductors whereby current for energizing said transmitter may be supplied from a central station over said conductors in parallel, said elements being so proportioned and related with respect to signaling current that the impedance of the combination comprising the line, the receiver, the auxiliary resistance and the transformer, as seen from the transmitter, is equal to the impedance of the transmitter.

8. An anti-side-tone substation including a transmitter, a receiver, an auxiliary resistance and a transformer, means for connecting said substation to a line consisting of two conductors whereby current for energizing said transmitter may be supplied from a central station over said conductors in parallel, said elements being so proportioned and related with respect to signaling current that the impedance of the combination comprising the transmitter, receiver, auxiliary resistance and transformer, as seen from the line, is equal to the series impedance of the line.

9. An anti-side-tone substation including a transmitter, a receiver, an auxiliary resistance and a transformer, means for connecting said substation to a line consisting of two conductors whereby current for energizing said transmitter may be supplied from a central station over said conductors in parallel, said elements being so proportioned and related with respect to signaling current that the impedance of the combination comprising the line in series, the receiver, the auxiliary resistance and the transformer, as seen from the transmitter, is equal to the impedance of the transmitter; and that the impedance of the combination comprising the transmitter, receiver, auxiliary resistance and transformer, as seen from the line, is equal to the series impedance of the line; and that said transmitter and said receiver are conjugate; and that said line and auxiliary resistance are conjugate.

10. In combination, a telephone substation including an anti-side tone resistance, a low resistance path and a transmitter, a source of energizing current for said transmitter, means whereby said source may send current through said transmitter, said low resistance path being connected to said substation so as to shunt said anti-side tone resistance but so that transmitted or received voice currents will not cause a potential to be impressed upon the terminals of said low resistance path.

11. In combination, a telephone substation including an anti-side tone resistance, a transmitter, a receiver having a winding, and a low resistance path, a source of energizing current for said transmitter, said low resistance path and at least a part of said anti-side tone resistance being in parallel with respect to said source of energizing current, said low resistance path having a terminal connected to the middle point of said receiver winding.

12. A substation circuit including a transmitter, a receiver and an auxiliary element, means for substantially preventing fluctuations of voltage of signaling frequency across said transmitter from producing fluctuations of current in said receiver and for preventing substantially any energy of received currents of signaling frequency from being expended in said auxiliary element, means to supply common battery current to said substation over two conductors of a line in parallel, and a ground return path, said substation also comprising means for preventing fluctuations of potential between the terminals of said ground path from causing fluctuations of current through said receiver.

13. An anti-side tone signaling substation including a receiver and a transmitter which are conjugate with respect to signaling frequencies, there being two paths through said substation, each said path uniting with the other at a common ground terminal at an end thereof and being connected to the sides of a line circuit at the other end thereof.

14. An anti-side tone signaling substation including a transformer having a plurality of windings and also including a receiver and a transmitter which are conjugate with respect to signaling frequencies, said substation having two terminals adapted to be connected respectively to two line conductors, there being a path through said substation from each of said terminals to ground, each winding of said transformer being equally divided between said paths.

15. In a telephone substation, an auxiliary resistance and three transformer windings, said resistance and each of said windings being divided into a pair of parts of substantial equality, a terminal adapted to be grounded, the members of each of said pairs being symmetrically located with respect to said terminal, and a receiver so related to said resistance and said windings as to be substantially free from side tone.

16. In a substation circuit, a calling bell, the coils of said bell in parallel forming an inductive combination and in series a substantially non-inductive combination, said series combination constituting a path for signaling current, but said parallel combination always having its terminals so connected in the circuit that it will not be traversed by signaling currents.

17. In a substation circuit, a calling bell, the coils of said bell forming an inductive path for ringing current and a non-inductive path for talking or signaling current.

18. In a telephone substation, a call receiving device, a balancing impedance element for reducing side tone, said element comprising the coils of said device and simulating the impedance of a line.

19. In a telephone substation, a call receiving device, an impedance element for reducing side tone, said element comprising the coils of said device, and means for rendering said impedance element substantially non-inductive for signaling currents.

20. In a telephone substation, a balancing impedance element for reducing side tone, said element consisting of the coils or windings of a bell so arranged that talking currents passing through one part of the coils will tend to set up a magnetic field which will be neutralized by the field set up in another part thereof.

21. A substation having a ground and two line conductor terminals, a bell in said substation having windings, paths from each of said conductor terminals to said ground, each of said paths containing one or more windings of said bell, a complete local circuit in said substation which contains said windings, said windings offering a non-reactive impedance to alternating currents traveling in said local circuit.

22. An anti-side tone telephone circuit including a transmitter, a receiver, a line, a transformer, an auxiliary resistance and a calling bell, the coils of said bell constituting said resistance, said elements being so related that substantially no signaling current from said transmitter passes through said receiver.

23. A telephone circuit including a transmitter, a receiver, a line, a transformer, an auxiliary resistance and a calling bell, the coils of said bell constituting said resistance, said resistance being non-inductive to signaling currents and said bell adapted to respond to ringing currents sent over said line from a distant point.

24. A telephone circuit including a transmitter, a receiver, a line, a transformer, an auxiliary resistance and a calling bell, the coils of said bell constituting said resistance, said resistance being non-inductive to signaling currents and said bell adapted to respond to ringing currents sent over said line from a distant point, the elements being so proportioned and related with respect to signaling current that the said transmitter and said receiver are conjugate.

25. A telephone circuit including a transmitter, a receiver, a line, a transformer, an auxiliary resistance and a calling bell, the coils of said bell constituting said resistance, said resistance being non-inductive to signaling currents and said bell adapted to respond to ringing currents sent over said line from a distant point, the elements being so proportioned and related with respect to signaling current that the said line and said non-inductive resistance are conjugate.

26. A telephone circuit including a transmitter, a receiver, a line, a transformer, an auxiliary resistance and a calling bell, the coils of said bell constituting said resistance, said resistance being non-inductive to signaling currents and said bell adapted to respond to ringing currents sent over said line from a distant point, said elements being so proportioned and related with respect to signaling current that the impedance of the combination comprising said line, said receiver, said auxiliary resistance and said transformer, as seen from said transmitter, is equal to the impedance of said transmitter.

27. A telephone circuit including a transmitter, a receiver, a line, a transformer, an auxiliary resistance, and a calling bell, the coils of said bell constituting said resistance, said resistance being non-inductive to signaling currents and said bell adapted to respond to ringing current sent over said line from a distant point, said elements being so proportioned and related with respect to signaling current that the impedance of the combination comprising said transmitter, said receiver, said auxiliary resistance and said transformer, as seen from said line, is equal to the impedance of said line.

28. An anti-side tone telephone substation circuit including a transmitter and a receiver which are in conjugate branches of said circuit with respect to signaling currents, all the branches of said circuit through which voice currents travel being conductive to direct current, means for feeding common battery current to said substation, said substation being arranged so that all current fed thereto from a common battery will pass through said transmitter.

29. A combination as in claim 28 in which said receiver is so associated with said substation that the common battery current does not affect said receiver.

30. A telephone system comprising two line conductors, a receiver connected between said conductors, a connection to ground from the midpoint of the receiver winding, said line conductors being connected to ground in parallel, a source of current between said ground connections, a transmitter, and means for substantially preventing signaling currents from said transmitter from energizing said receiver.

31. An anti-side-tone substation circuit, comprising a transmitter circuit, a receiver circuit inductively related to said transmitter circuit, a resistance in said receiver circuit for balancing out side-tone in said receiver, a conductive connection from the midpoint of said resistance to said transmitter circuit, and means for supplying direct current for said transmitter through the sides of said receiver circuit in parallel.

32. An anti-side-tone substation circuit, comprising a transmitter circuit, a receiver circuit inductively related to said transmitter circuit, a resistance in said receiver circuit for balancing out side-tone in said receiver, said resistance comprising the windings of a bell, a conductive connection from the midpoint of said resistance to said transmitter circuit, and means for supplying direct current for said transmitter through the sides of said receiver circuit in parallel.

In witness whereof, I hereunto subscribe my name this 19th day of January, A. D. 1918.

KENNETH S. JOHNSON.